Patented June 24, 1952

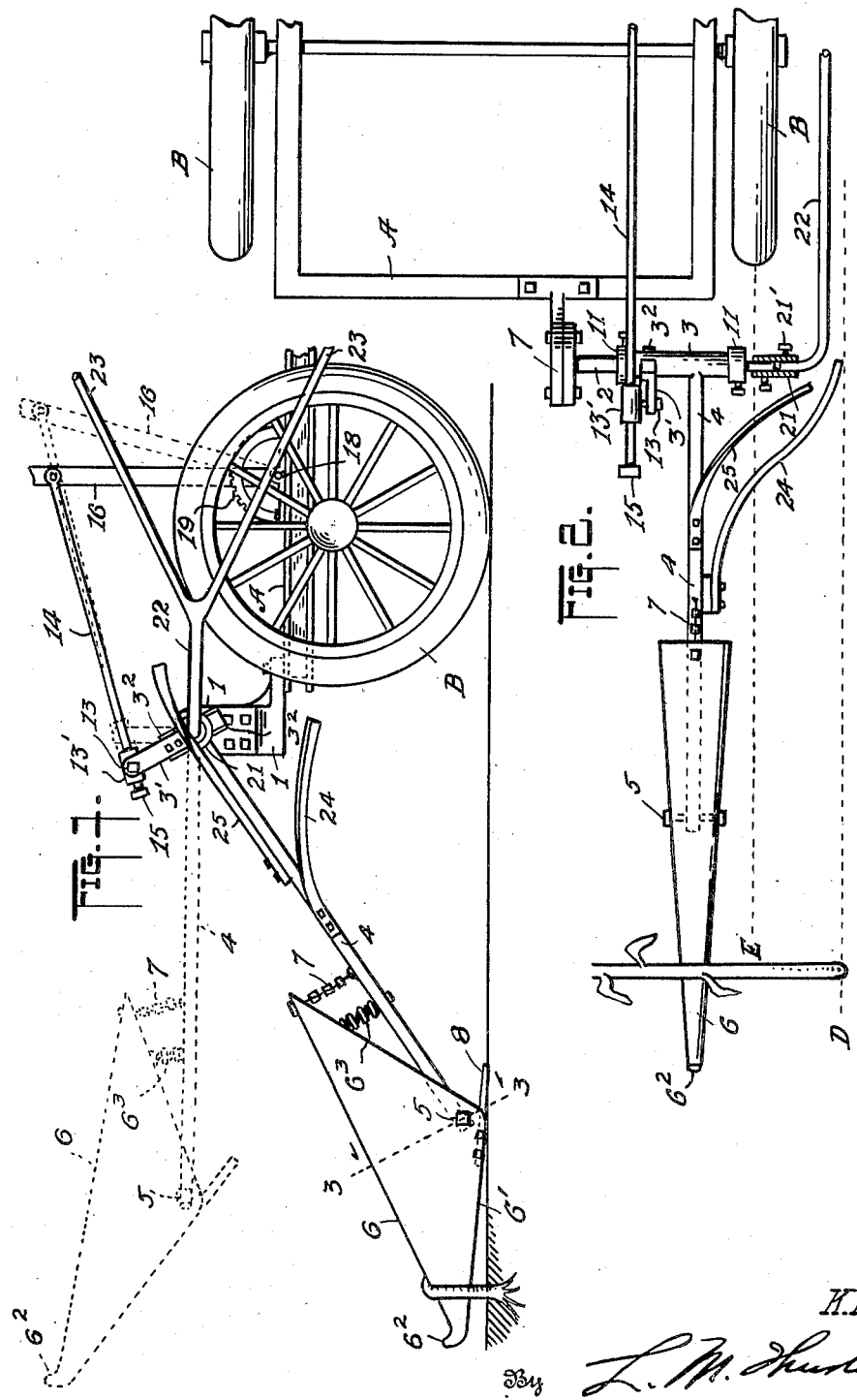

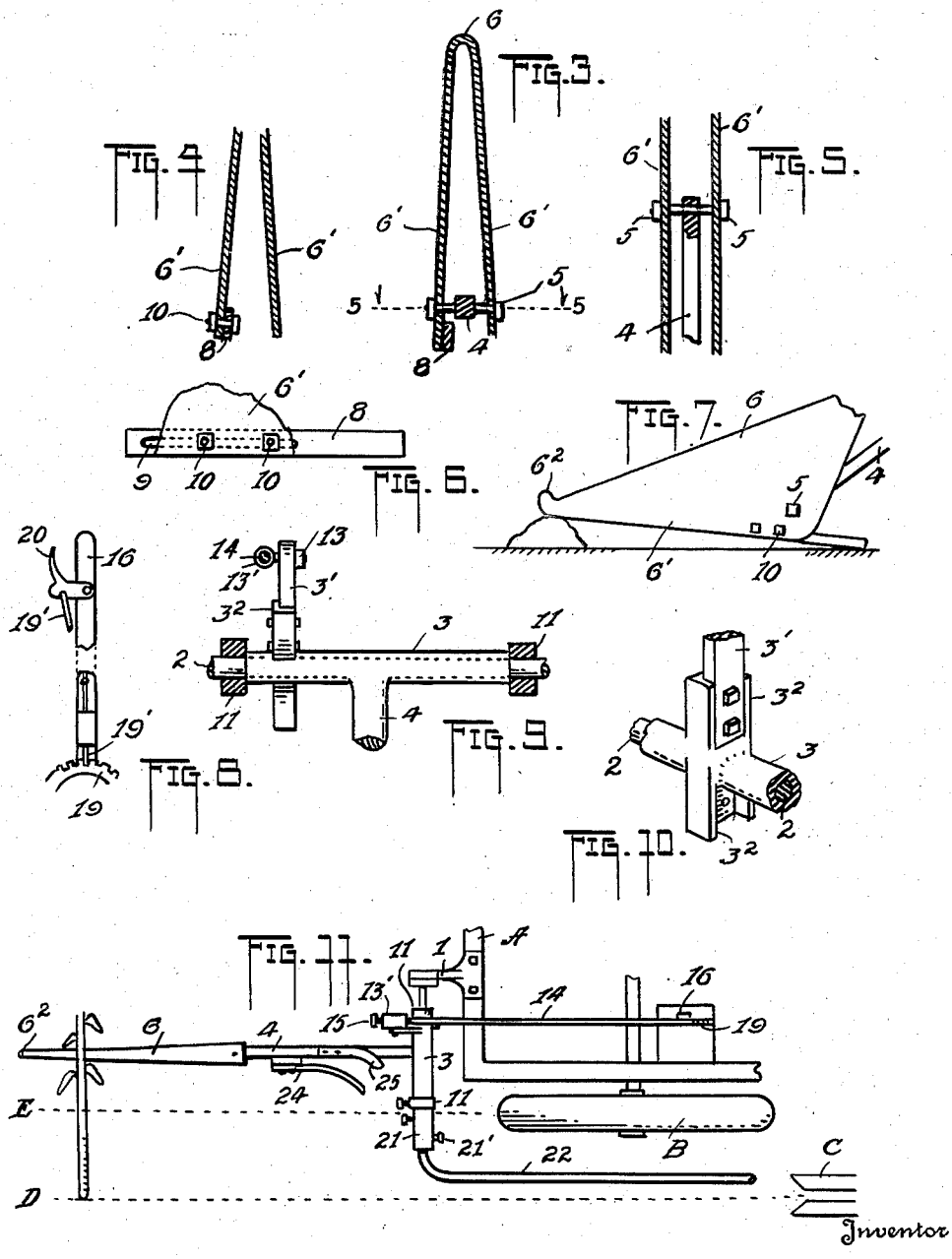

2,601,305

UNITED STATES PATENT OFFICE 2,601,305

APPARATUS FOR RAISING RECLINING CORN PLANTS TO VERTICAL POSITIONS

Kermit D. Laun, New Holland, Ill.

Application September 27, 1948, Serial No. 51,396

6 Claims. (Cl. 56—119)

1

This invention relates to means for use in the field for engaging beneath, lifting, and placing fallen corn plants in position for their ultimate entry into a corn picking machine.

In a field fallen plants from which the ears are to be removed often so lie that the wheels of a tractor preceding and drawing a corn picker destroy or force said plants into the ground so that they cannot reach the picker in its rounds, the ears thus being lost, or at least lost as to said picker, since forced into the ground, in many instances, by said wheels.

The object, therefore, of this invention is to provide a "pickup" means on the tractor lying ahead of the tractor-wheels which, in its travel with said tractor, will lift any fallen plant and place it in such a position that in the eventual advance of the picker said plant can at any time be properly received into it for processing.

Figure 1 is a side elevation of the machine according to said invention.

Figure 2 is a plan of the machine of said invention produced on a larger scale.

Figure 3 is an end elevation of part of the mechanism, the same being shown in section.

Figure 4 is an end elevation in part section of part of what is shown in Figure 3 but on a larger scale.

Figure 5 is a plan in part section, much enlarged, of Figure 3 produced on line 5—5 thereof.

Figure 6 is a side elevation of parts shown in Figure 4.

Figure 7 is a side elevation of a portion shown in Figure 1 but having a different position from that shown in said figure.

Figure 8 is an elevation of a hand lever shown in Figure 1.

Figure 9 is a rear elevation of certain parts illustrated in Figures 1 and 2, much enlarged.

Figure 10 illustrates in perspective a lever-arm mounting shown in Figure 1, and Figure 11 is a plan of the machine shown in Figure 2 showing its relation to a cornpicking machine, but part of the latter being shown.

In the drawings A and B denote, respectively, the frame and two of the wheels of a tractor by which to carry the structure now to be described. Said frame A carries a support 1 secured to what may be termed the front of said tractor. In this instance a rod 2 is suitably mounted on and secured to the support 1 and extends horizontally therefrom, and mounted to rock on said rod is a sleeve 3 from which forwardly extends a rock-arm 4. It will be noted that the only permissible movement of the arm

2

4 in the normal operation of the machine is in a vertical plane.

Pivoted on the extremity of said arm, on a horizontal axis is what may be termed a "pickup" member or shoe 6. This may consist of a plate of sheet metal bent upon itself, as a U, thus forming spaced portions 6', see Figures 3, 4 and 5, the said portions receiving through them, near their lower edge a bolt 5 serving as a pivoting member therefor, said bolt passing through the said extremity of the arm 4 as in Figure 5. The edges of the portion 6' in this instance, angle upwardly in opposite directions from the vicinity of the bolt 5 and terminate at the extremities of the top or fold of said members 6' as in Figures 1 and 7.

If desired an upturned nose portion or runner $6^2$ may be provided at the leading end of the member 6, as shown in the drawing, for the purpose of lifting the same over rough ground in the advance of the device.

The normal or working position of this member or shoe 6 is as in Figure 1. That is to say, its forward end or nose, may be slightly spaced from the ground surface, being there maintained by a chain 7, as an example, attached to and between the arm 4 and the rear end of said member, it being understood that in its normal working position said rear end lies in spaced relation to the arm as permitted by the said chain, that portion of the member 6 lying forward of the bolt 5 having the preponderance of weight, assisted if desired by a compression spring $6^3$ interposed between the said member and said rock-arm 4.

Extending from the said member 6 below the bolt 5, for example, is a heel portion 8, see particularly Figures 1 and 7. This is merely a bar which may be an extension of one of the portions 6', or as in said Figures 4 and 5 it may be slidable. In this case, as an example, the bar may have a slot 9 created longitudinally therein and a pair of bolts 10 held in the adjacent portions 6' passes through the slot to serve, on being tightened, for fixing the bar in any given position in its longitudinal adjustment.

Returning now to the sleeve 3 it is observed that a lever-arm 3' extends upwardly therefrom which may lie substantially at right angles to the described arm 4 by preference.

Preferably, a member $3^2$ of channel form, in this instance, extends from opposite sides of the sleeve 2 to either of which the said lever-arm may be secured. That is to say, it is necessary, sometimes, to invert the rod 2 and the sleeve structure 3 in order to accommodate either right or left hand tractor structures.

In other words the rod 2 may be removed from the support or bracket 1, turned end for end and attached to said bracket at the other side thereof as occasion demands, and thus the lever-arm may be changed from one member 3² to the other in order that it shall always be uppermost, or always above the sleeve 3 in correct operative position. It is to be observed that preferably a pair of collars 11 with set screws 12 mounted on the rod 2 serve to hold sleeve 3 in position on the latter, yet permitting said sleeve to rock.

The free end of the lever-arm 3' pivotally carries at 13 a tubular member 13' adapted to rock in a vertical plane. Slidable through the latter is a rod 14 provided at one end with a head 15, the other end having pivotal connection with a hand lever 16 provided at its lower end at 17 upon a bracket 18 secured in any manner to the tractor frame, while any usual notched sector 19 is also secured to the said frame to receive any usual latch 19' on a rod 20 of a hand grip 20'. also of any usual type.

Secured in any suitable way to the named member 2 is a socket-member 21 having a set screw 21'. Into this member is inserted one end of what may be termed a "guide bar" 22 which by preference, merely, terminates in two divergent portions or fingers 23 which lie in a vertical plane as suggested in Figure 1, these being curved rearwardly. This structure serves to support corn plants that have been erected, as will appear presently.

In addition to the guide bar 22 other outwardly curved guiding bars 24 and 25 may likewise be used if desired, these being affixed to the arm 4 as a convenient support therefor.

During operation in the field the parts of the mechanism have substantially the positions shown in Figure 1, the member 6 moving forward with the rear of heel portion in contact with the ground, rising and falling with the undulations thereof. As small obstructions are met the nose portion is lifted as said member pivots upon the bolt 5. At any time should the member meet an upwardly inclined part of the field being traversed while the tractor wheels are still on lower ground, or when said member meets a large obstruction, it will ride over the same, and its rear portion at the chain 7 may abut the arm 4 about the rod 2, the tubular member 13 freely shifting along the rod 14 without hindrance to the arm 3' in its movement with said arm 4. Thus a floating action of the named structure results. In normal action, however, should the shoe 6 tend to rise at its leading end, or nose, it will at once be forced downwardly due to the fact that the heel portion 8 lies rearward of the pivoting bolt 5. That is to say said heel portion is held down by the weight of the shoe and the arm 4, the extremity of the heel thus fulcruming on the ground, depressing said nose.

If at any time the structure is to be lifted from the ground on account of any great obstruction, or if the further operations are to cease in the field, the arm 4 and its member 6 may be lifted clear of the ground to any such position shown in broken lines in Figure 1, and there held. This action results by shifting rearwardly the hand lever 16, and latching it, the head 15 on the said rod 14 abutting the tubular member 13 for the lifting action.

By a study of Figure 11 the relation of the tractor and picking machine denoted at C will be seen.

Also the relation of the "pick up" member 6 will be noted with relation to a corn row denoted by the dotted line D, and also the relation of the line of travel of the tractor wheel B on dotted line E to said corn row. In the figure named, a corn plant has been represented in a reclining position by extending from its planted position in the corn row across directly in the path of travel of the tractor wheel. If not lifted from this position the wheel would ride over the plant, forcing it into the ground, its ears being lost. However, the pickup member or shoe 6, which precedes the wheel, and which moves along quite close to the ground, will pass beneath the plant and lift it to a more or less upright position aided by the guide members 24, 25 and 22 in their order, in the tractor travel or lifts said plant to any such position, at least, that the picking machine will eventually receive it for the ear severing operation.

So long as the plant is partially lifted and retains that position by the means described, the picker will readily receive it.

It is seen that by the structure described the raised plants will be maintained in spaced relation to the wheel B, or until all danger of destruction by the latter is at an end, the picking machine, in following, performing its work.

Since plants vary in height the guide bar 22 is bifurcated as shown and described so that both low and high plants may be readily controlled. This said bar may be changed in height by rotating it within the socket member 21, and further, it may be shifted toward or away from the position of the plant row if desired.

In respect to the extension 8 of the member 6 it may be stated that to provide a more positive control of the latter when meeting an obstruction illustrated in Figure 8 the entire structure shown in that figure will be tilted on said extension to lift the nose 6² to a higher position to clear any further, or higher obstruction that may lie ahead in the progress of the said member 6. It may be stated that in reversing the rod 2 on the bracket 1, as referred to herein, it is necessary, of course, to remove the bolt 5 to release the member 6 in order that the latter and the rock-arm 4 may have proper relation relatively in the new position of said rod 2. Of importance is the fact that the structure herein is fully under control in that the rock-arm manually adjusts the member 6 for ground level and also lifts it to inoperative position for transportation, while the chain 7 and the spring 6³ connected between the shoe and arm have their functions as well, as has been set forth.

While the structure herein shown and described serves the purpose intended it is understood that equivalent structures may be used as within the meaning of the invention and the claims thereto.

What is claimed is:

1. In a device for raising reclining plants to a vertical position, which device is adapted to be attached to a conventional tractor having a frame and spaced wheels determining the tread of the tractor, a pointed shoe adapted to travel close to the ground in advance of said tractor, said shoe having a rearwardly extending heel portion and a top surface portion inclined upwardly and rearwardly from the point of said shoe, a bracket mounted on the frame of said tractor, a horizontal supporting rod carried by said bracket, a sleeve mounted to rock on said rod, an arm carried by said sleeve and fixed against lateral pivotal movement with respect thereto and adapted to rock in a vertical plane and having pivotal connection with said shoe forwardly of said heel portion, and an adjustable hand lever pivoted to the frame of said tractor and operatively connected to said arm for raising the same and permitting it to lower, said arm being free to raise with respect to the lever.

2. In a device for raising reclining plants to a vertical position, which device is adapted to be attached to a conventional tractor having a frame and spaced wheels determining the tread of the tractor, a pointed shoe adapted to travel close to the ground in advance of said tractor, said shoe having a rearwardly extending heel portion and a top surface portion inclined upwardly and rearwardly from the point of said shoe, a bracket mounted on the frame of said tractor, a horizontal supporting rod carried by said bracket, a sleeve mounted to rock on said rod, an arm carried by said sleeve and fixed against lateral pivotal movement with respect thereto and adapted to rock in a vertical plane and having pivotal connection with said shoe forwardly of said heel portion, and an adjustable hand lever pivoted to the frame of said tractor and operatively connected to said arm for raising the same and permitting it to lower, said arm being free to raise with respect to the lever, and a flexible member extending between the arm and the shoe and connected to the shoe at a point above the pivotal connection thereof with the arm.

3. In a device for raising reclining plants to a vertical position, which device is adapted to be attached to a conventional tractor having a frame and spaced wheels determining the tread of the tractor, a pointed shoe adapted to travel close to the ground in advance of said tractor, said shoe having a rearwardly extending heel portion and a top surface portion inclined upwardly and rearwardly from the point of said shoe, a bracket mounted on the frame of said tractor, a horizontal supporting rod carried by said bracket, a sleeve mounted to rock on said rod, an arm carried by said sleeve and fixed against lateral pivotal movement with respect thereto and adapted to rock in a vertical plane and having pivotal connection with said shoe forwardly of said heel portion, and an adjustable hand lever pivoted to the frame of said tractor and operatively connected to said arm for raising the same and permitting it to lower, said arm being free to raise with respect to the lever, and a flexible member extending between the arm and the shoe and connected to the shoe at a point above the pivotal connection thereof with the arm, and a compression spring interposed between said arm and said shoe between said pivotal connection and said bracket.

4. In a device for raising reclining plants to a vertical position, which device is adapted to be attached to a conventional tractor having a frame and spaced wheels determining the tread of the tractor, a pointed shoe adapted to travel close to the ground in advance of said tractor, said shoe having a rearwardly extending heel portion and a top surface portion inclined upwardly and rearwardly from the point of said shoe, a bracket mounted on the frame of said tractor, a horizontal supporting rod carried by said bracket, a sleeve mounted to rock on said rod, an arm carried by said sleeve and fixed against lateral pivotal movement with respect thereto and adapted to rock in a vertical plane and having pivotal connection with said shoe forwardly of said heel portion, and an adjustable hand lever pivoted to the frame of said tractor and operatively connected to said arm for raising the same and permitting it to lower, said arm being free to raise with respect to the lever, and guide members mounted on said arm and extending laterally to a position laterally of the tread of said tractor whereby reclining plants raised by said shoe are supported in an upright position while the tractor in its forward movement passes the plant.

5. In a device for raising reclining plants to a vertical position, which device is adapted to be attached to a conventional tractor having a frame and spaced wheels determining the tread of the tractor, a pointed shoe adapted to travel close to the ground in advance of said tractor, said shoe having a rearwardly extending heel portion and a top surface portion inclined upwardly and rearwardly from the point of said shoe, a bracket mounted on the frame of said tractor, a horizontal supporting rod carried by said bracket, a sleeve mounted to rock on said rod, an arm carried by said sleeve and fixed against lateral pivotal movement with respect thereto and adapted to rock in a vertical plane and having pivotal connection with said shoe forwardly of said heel portion, and an adjustable hand lever pivoted to the frame of said tractor and operatively connected to said arm for raising the same and permitting it to lower, said arm being free to raise with respect to the lever, and guide members mounted on said arm and extending laterally to a position laterally of the tread of said tractor whereby reclining plants raised by said shoe are supported in an upright position while the tractor in its forward movement passes the plant, and a guide member adapted to be mounted on said bracket and extending laterally beyond the wheel of said tractor on the same side thereof where said first mentioned guide members are located, and having an outer portion extending parallel to the line of advance of said tractor.

6. In a device for raising reclining plants to a vertical position, which device is adapted to be attached to a conventional tractor having a frame and spaced wheels determining the tread of the tractor, a pointed shoe adapted to travel close to the ground in advance of said tractor, said shoe having a rearwardly extending heel portion and a top surface portion inclined upwardly and rearwardly from the point of said shoe, a bracket mounted on the frame of said tractor, a horizontal supporting rod carried by said bracket, a sleeve mounted to rock on said rod, an arm carried by said sleeve and fixed against lateral pivotal movement with respect thereto and adapted to rock in a vertical plane and having pivotal connection with said shoe forwardly of said heel portion, and an adjustable hand lever pivoted to the frame of said tractor and operatively connected to said arm for raising the same and permitting it to lower, said arm being free to raise with respect to the lever, and guide members mounted on said arm and extending laterally to a position laterally of the tread of said tractor whereby reclining plants raised by said shoe are supported in an upright position while the tractor in its forward movement passes the plant, and a guide member adapted to be mounted on said bracket and extending laterally beyond the wheel of said tractor on the same side thereof where said first mentioned guide members are located, the end portions of said guide members mounted on said bracket extending generally parallel to the line of advance of said tractor and being positioned in substantially a vertical plane.

KERMIT D. LAUN.

REFERENCES CITED

The following references are of record in the file of this patent:

UNITED STATES PATENTS

| Number | Name | Date |
|---|---|---|
| 1,713,291 | Mainland | May 14, 1929 |
| 2,352,506 | Zirckel | June 27, 1944 |